United States Patent
Collins et al.

(10) Patent No.: US 6,915,393 B2
(45) Date of Patent: Jul. 5, 2005

(54) METHOD AND APPARATUS FOR PHYSICAL MEMORY PARTITIONING

(75) Inventors: David L. Collins, Magnolia, TX (US); Steven Ray Dupree, The Woodlands, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 232 days.

(21) Appl. No.: 10/337,605

(22) Filed: Jan. 7, 2003

(65) Prior Publication Data

US 2004/0133751 A1 Jul. 8, 2004

(51) Int. Cl.[7] .............................................. G06F 12/00
(52) U.S. Cl. ..................... 711/153; 711/220; 711/203
(58) Field of Search ................................ 711/153, 220, 711/202, 203

(56) References Cited

U.S. PATENT DOCUMENTS

| | | | | |
|---|---|---|---|---|
| 5,657,476 A | * | 8/1997 | O'Connell et al. | 711/166 |
| 5,784,706 A | * | 7/1998 | Oberlin et al. | 711/202 |
| 6,381,682 B2 | * | 4/2002 | Noel et al. | 711/153 |
| 6,438,671 B1 | * | 8/2002 | Doing et al. | 711/173 |
| 6,647,508 B2 | * | 11/2003 | Zalewski et al. | 714/3 |

* cited by examiner

Primary Examiner—Matthew D. Anderson

(57) ABSTRACT

The disclosed embodiments relate to a device for generating physical addresses in a multi-processor computer system. The computer system may be adapted to support multiple physical memory partitions. Agent IDs for each of a plurality of processors may be used to correspond with a partition offset, which may be used to define a separate physical memory partition for each processor. The partition offset may be used with a virtual address to form a physical address.

22 Claims, 4 Drawing Sheets

METHOD AND APPARATUS FOR PHYSICAL MEMORY PARTITIONING

BACKGROUND OF THE RELATED ART

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Since the introduction of the first personal computer ("PC") over 20 years ago, technological advances to make PCs more useful have continued at an amazing rate. Microprocessors that control PCs have become faster and faster, with operational speeds eclipsing the gigahertz (one billion operations per second) and continuing well beyond.

Productivity has also increased tremendously because of the explosion in development of software applications. In the early days of the PC, people who could write their own programs were practically the only ones who could make productive use of their computers. Today, there are thousands and thousands of software applications ranging from games to word processors and from voice recognition to web browsers.

Not surprisingly, the increasing complexity of computers and software applications has presented technologists with some challenging obstacles along the way. One such obstacle is the continual increase in the amount of computing power that is needed to run increasingly large and complex software applications. Increased computing power is also needed to allow networked computer systems to provide services such as file and printer sharing to larger numbers of users in a cost effective manner.

The development of the multi-processor server has been a major advance in the ability of computer manufacturers to provide significant increases in computing power. Multi-processor servers may include two, four, eight or even more individual processors. The processors in a multi-processor may be configured to operate under control of an operating system (an "OS") in a symmetric manner. Symmetric multi-processing is a term that is used to refer to a multi-processing computer system in which any processor is capable of handling any task.

Designers of multi-processor computer systems continually try to improve the versatility and flexibility of their systems to perform different tasks. Examples of tasks that may enhance the performance capabilities of multi-processor computing systems may include the ability of a single multi-processor system to operate different OSes simultaneously, or to operate multiple instances of the same operating system simultaneously. An obstacle to this goal is that some operating systems employ zero-based physical memory dependencies, which require certain portions of the OS code to be stored at specific address locations in physical memory. Such an OS may generate a virtual address, which may correspond on a 1:1 basis with an address in the physical memory map of a computer system. If the virtual address generation functionality of an OS always generates addresses in the same physical memory range for a portion of code, such as the kernel, multiple instances of that operating system cannot be executed by a single multi-processor system without conflict. In the same manner, different OSes that attempt to use the same physical memory space could not be operated simultaneously without conflict.

One method of attempting to overcome this problem may include interposing a software layer under the OS to intercept and modify virtual addresses generated by the OS. The addition of a separate software layer, however, may result in significant performance degradation of the system. Another alternative may be to modify the source code of an OS to remove physical memory dependencies, but this process would be expensive and time consuming.

BRIEF DESCRIPTION OF THE DRAWINGS

Advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
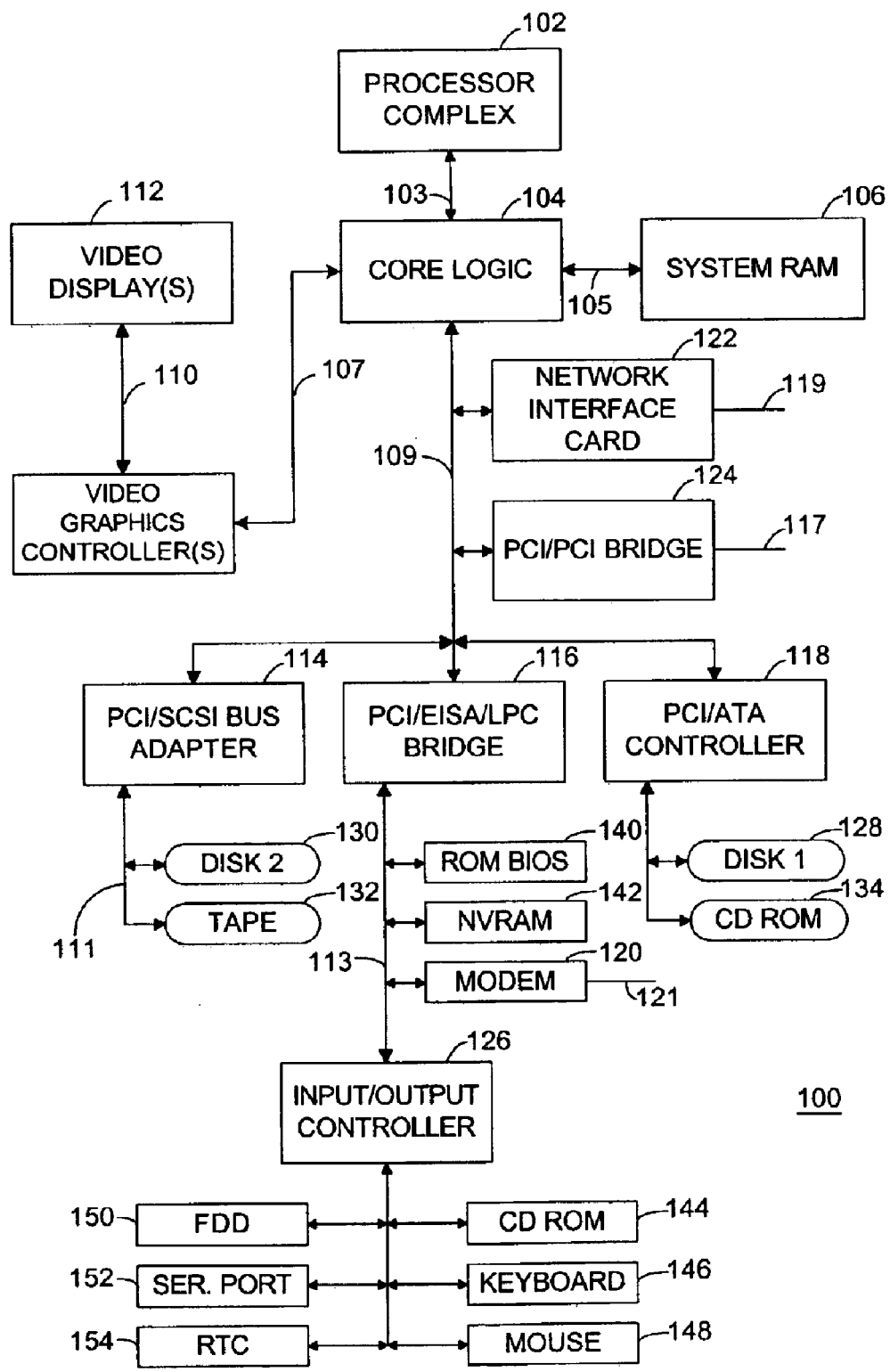
FIG. 1 is a block diagram illustrating an exemplary multi-processor computer system.

Referring now to FIG. 1, a schematic block diagram of a multi-processor computer system is illustrated. A computer system is generally indicated by the numeral 100 and may comprise a processor complex 102. The processor complex 102 may comprise a plurality of central processing units ("CPUs"), which may also be referred to as processors or symmetric agents. Also included in the computer system 100 may be core logic 104 (or north bridge), system random access memory ("RAM") 106, a video graphics controller(s) 110, a video display(s) 112, a PCI/SCSI bus adapter 114, a PCI/EISA/ISA bridge 116, and a PCI/ATA controller 118. Single or multilevel cache memory (not illustrated) may also be included in the computer system 100 according to the current art of microprocessor computer systems. The processor complex 102 may be arranged in a symmetric or asymmetric multi-processor configuration.

In the operation of a multi-processor computer system, one of the processors that comprise the processor complex 102 may be designated as the bootstrap processor (BSP) by the system BIOS shortly after the computer system is first powered on. The BSP may execute the system power-on self test ("POST") while the other processors (the application processors or APs) remain in a sleeping or quiescent state. After executing the POST, the BSP may boot the operating system, which subsequently assigns tasks to the APs.

The processor complex 102 may be connected to the core logic 104 through a host bus 103. The system RAM 106 may be connected to the core logic 104 through a memory bus 105. The video graphics controller(s) 110 may be connected to the core logic 104 through an AGP bus 107 (or other bus for transporting video data). The PCI/SCSI bus adapter 114, PCI/EISA/LPC bridge 116, and PCI/ATA controller 118 may be connected to the core logic 104 through a primary PCI bus 109. Those of ordinary skill in the art will appreciate that a PCI-X bus or Infiniband bus may be substituted for the primary PCI bus 109. The specific protocol of the bus 109, although other protocol may be suitable as well.

A network interface card ("NIC") 122 and a PCI/PCI bridge 124 may also be connected to the PCI bus 109. Some of the PCI devices such as the NIC 122 and PCI/PCI bridge 124 may plug into PCI connectors on the computer system 100 motherboard (not illustrated). The PCI/PCI bridge 124 may provide an additional PCI bus 117.

Hard disk 130 and tape drive 132 may be connected to the PCI/SCSI bus adapter 114 through a SCSI bus 111. The NIC 122 may be connected to a local area network 119. The PCI/EISA/LPC bridge 116 may connect over an EISA or LPC bus 113 to a non-volatile random access memory (NVRAM) 142, modem 120, and/or input-output controller 126. The NVRAM 142 may store the system BIOS and/or other programming and may include flash memory. Additionally, the NVRAM may be contained in a programmable logic array ("PAL") or any other type of programmable non-volatile storage. The modem 120 may connect to a telephone line 121. The input-output controller 126 may interface with a keyboard 146, CD-ROM drive 144, mouse 148, floppy disk drive ("FDD") 150, serial/parallel ports 152, and/or a real time clock ("RTC") 154.

Figure 2:
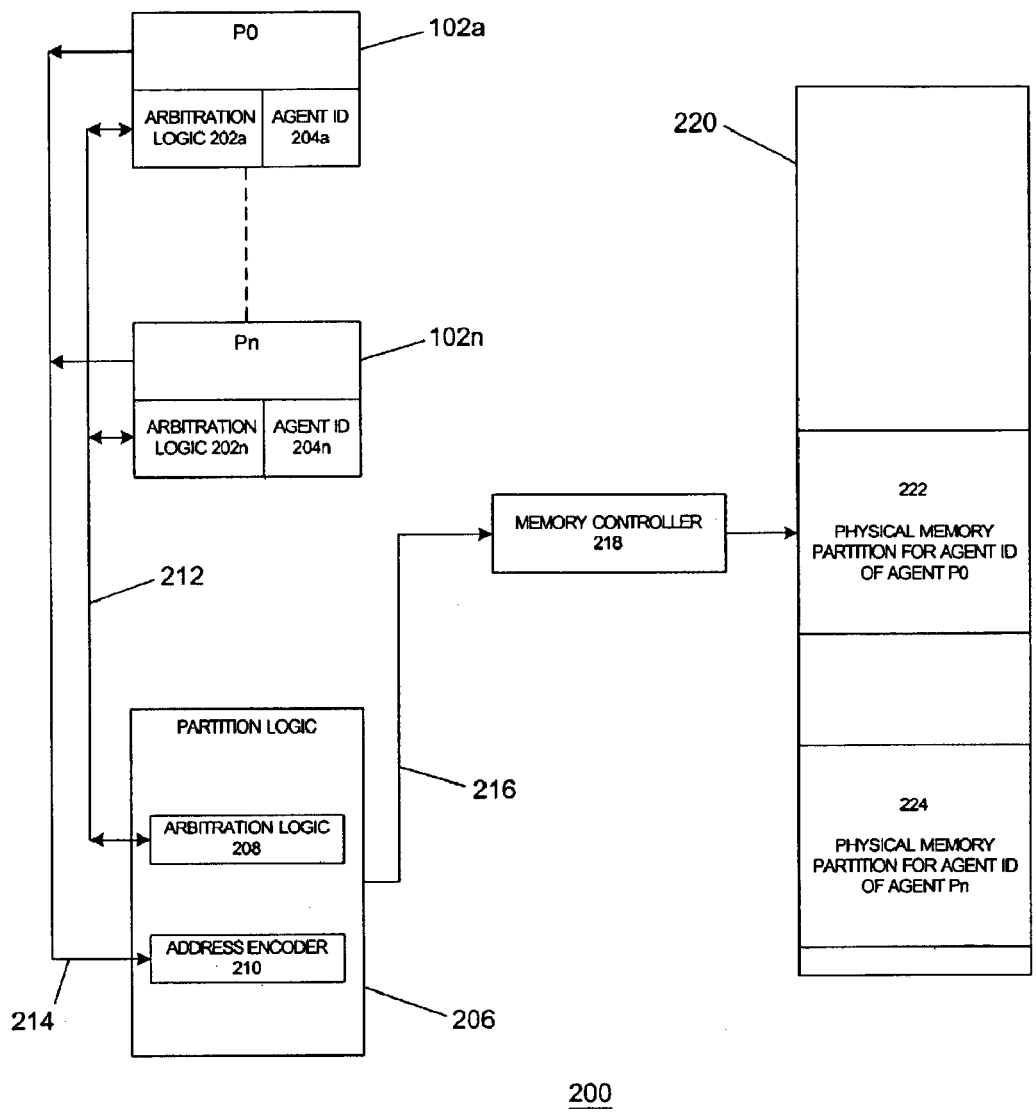
FIG. 2 is a functional block diagram according to embodiments of the present invention.

FIG. 2 is a functional block diagram according to embodiments of the present invention. The system shown in FIG. 2 is generally referred to by the reference numeral 200. A plurality of processors 102a–102n, which may be referred to as symmetric agents, may form the processor complex 102 (FIG. 1) of a multi-processor computer system 100 (FIG. 1). Each of the processors 102a–102n may have arbitration logic 202a–202n associated therewith. The computer system 100 (FIG. 1) may contain any number of symmetric agents or processors. When the computer system 100 (FIG. 1) is initialized or reset, the processors 102a–102n, via the arbitration logic 202a–202n, may enter into an arbitration process to be assigned symmetric agent IDs 204a–204n. After the symmetric agent ID for each processor is determined, the symmetric agent ID associated with each processor is stored in a memory location or register associated with the processor.

The symmetric agent ID for each processor is used during the normal operation of the processor to identify transactions that are initiated or directed to specific processors. For instance, when the processor 102a initiates a transaction on a bus, such as the PCI bus 109, the data transferred on the PCI bus 109 may include the symmetric agent ID 204a. The inclusion of the symmetric agent ID in transaction data facilitates coherency because data that is retrieved or generated in response to a transaction may be returned to the symmetric agent or processor that initiated the transaction.

The computer system 100 may include partition logic 206, which may be used to allow placement of data in physical memory to be indexed or partitioned based on the symmetric agent ID 204a–204n of the symmetric agents or processors 102a–102n. In other words, the partition logic may be used to create physical memory partitions for each of the symmetric agents or processors 102a–102n based on their respective symmetric agent IDs 204a–204n. The partition logic 206 may be used to create separate physical memory partitions even though an operating system (OS) enforces a policy of zero-based physical memory dependency. This means that the partition logic 206 may be used to allow the computer system 100 (FIG. 1) to run multiple OSes simultaneously.

The partition logic 206 may additionally be used to allow the computer system 100 (FIG. 1) to run multiple instances of the same OS even if the OS requires location of certain code (such as the kernel) at a fixed location in system physical memory. This is true because the partition logic 206 may support partitioning independent of the virtual address generated by the OS. Even if the OS enforces a 1:1 correspondence between virtual memory address generated by the OS and the physical memory address, the partition logic 206 may still relocate code in a separate partition in physical memory without modification to the source code of the OS and without interposing a separate software layer to generate modified physical addresses based on the virtual address provided by the OS. In this manner, multiple instancess of the same OS may be run simultaneously on the computer system 100 (FIG. 1) without conflict between the multiple OS instances over physical memory coherency.

The partition logic 206 may include arbitration logic 208 and an address encoder 210. The arbitration logic 208 may be connected to the arbitration logic 202a–202n of each of the symmetric agents or processors 102a–102n by a bus 212. The address encoder 210 may be adapted to receive memory addresses from the symmetric agents or processors 102a–102n via a bus 214. The partition logic may be adapted to provide modified addresses via a bus 216 to a memory controller 218, which may comprise part of the core logic 104 (FIG. 1).

The arbitration logic 208 may participate in the arbitration process in which the symmetric agent IDs or processors 102a–102n are assigned the agent IDs 204a–204n. In this manner, the partition logic 206 has access to the agent IDs 204a–204n of the plurality of processors 102a–102n. The agent IDs 204a–204n may be used by the address encoder 210 to generate an address into a physical memory partition that is at least partially defined by the agent ID of the processor requesting a memory transaction. In other words, the partition logic 206 may create an abstracted partition in physical memory by directing all addresses generated by a particular processor or symmetric agent to a region of physical memory based on the agent ID of a particular processor. The agent ID may be used directly as the partition offset, or it may be modified or used as an index into a table or other storage mechanism, which may store a partition offset that is based on the agent ID.

The arbitration logic 208 may determine the agent ID of the next bus owner as early as possible before the start of a bus request phase. The winning agent ID may be scaled to a value determined by a partitioning algorithm to form the most significant portion of an abstracted physical address that may be merged with the original address (which may correspond to the virtual address generated by the OS in systems with zero-based memory dependencies) and then forwarded to the memory controller 218. As an example, the agent ID may be used to create an address offset that may be combined into bit positions of virtual address bits that would ordinarily be zero when received from the OS. In this manner, the operation of the partition logic 206 may remain transparent from the perspective of the OS.

As an alternative, the partition logic 206 may derive or decode the agent IDs for the symmetric agents or processors 102a–102n by monitoring bus transactions, which may include a request phase. One example of this method of determining the agent IDs may include determining the agent ID from a defined piece of data such as a deferred identifier (DID) signal that may be used in systems that employ processors manufactured by Intel Corporation of Santa Clara, Calif. If the agent IDs 204a–204n are derived or decoded instead of identified during an arbitration phase, the partition logic 206 may not use arbitration logic 208 for participating in the arbitration process.

System firmware bootstrap code may provide information about the required size of a physical memory partition to an OS boot loader upon invocation of certain functions, such as INT1465. FUNC E820h (Legacy) or EFI GetMemoryMap( ) (IPF). A copy of a partition address map, which may include a partition starting address and partition size, may be maintained in the NVRAM 142 (FIG. 1) or other suitable location for use by system firmware/management software.

The partition-based physical addresses generated by the partition logic 206 are passed to the memory controller 218, which may perform the requested memory operation. In performing its function, the memory controller 218 accesses a physical address space 220. As shown in FIG. 2, the partition logic 206 may be used to create separate physical memory partitions for each individual symmetric agent or processor 102a–102n. For example, the agent ID 204a of the processor 102a may be used to create a physical partition 222 that is addressable only by the processor 102a. This is true because the agent ID 204a of the processor 102a is used to form physical addresses for transactions initiated by the processor 102a. The physical memory partition 222 may be used to store executable code or data such as the kernel, heap, stack, data or the like for one instance of an operating system. Similarly, the agent ID 204n of the processor 102n may be used to create a physical partition 224 that is addressable only by the processor 102n. This is true because the agent ID 204n of the processor 102n is used to form physical addresses for transactions initiated by the processor 102n. The physical memory partition 224 may be used to store executable code or data such as the kernel, heap, stack, data or the like for a separate instance of an operating system. Because of the physical addresses generated by the partition logic, the multiple instances of the OS may execute compatibly, without interference with each other.

Additionally, the partition logic 206 may be set up to allow access to one or more specific physical memory partitions by multiple symmetric agents or processors. For example, the partition logic 206 may contain a table or other mapping structure that associates a specific offset with more than one of the agent IDs 204a–204n. In that case, the addresses generated by the address encoder 206 may include a common offset for transactions initiated by more than one of the symmetric agents or processors 102a–102n, giving processors that are mapped to a common offset access to the same physical memory partition.

Figure 3:
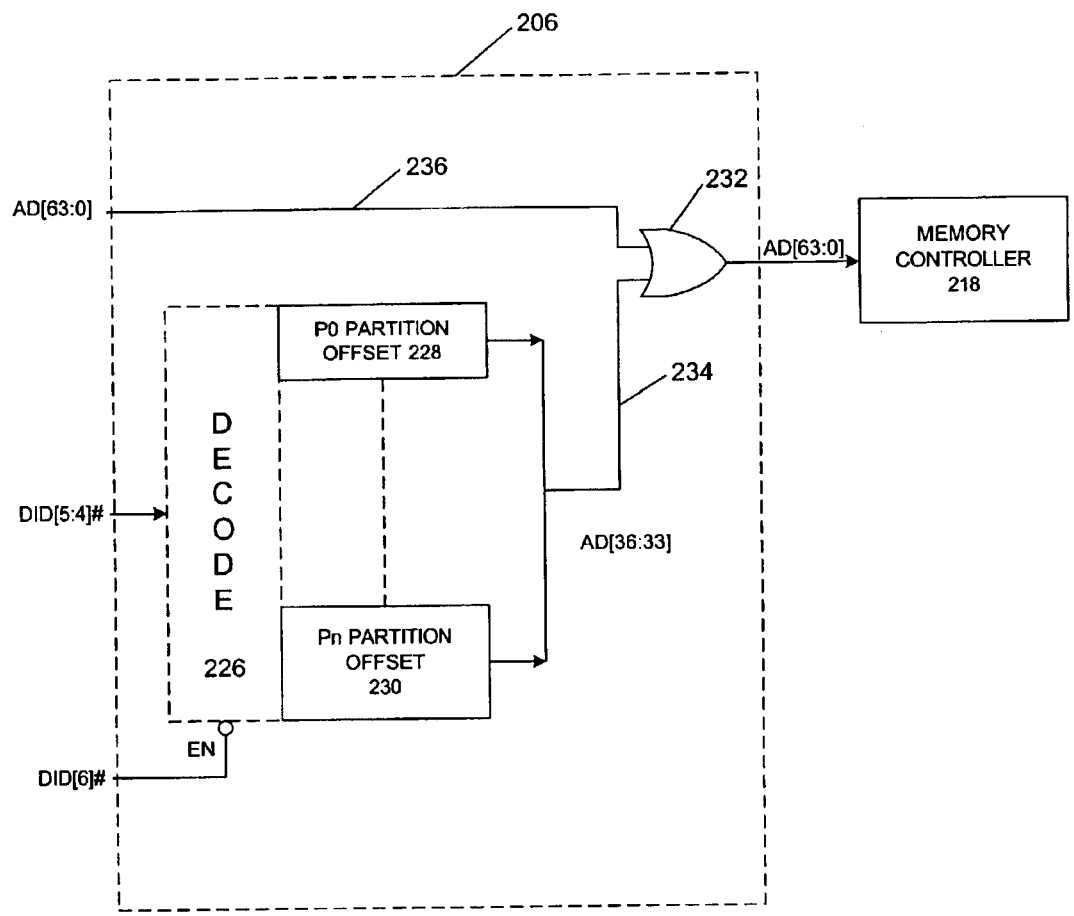
FIG. 3 is a circuit diagram according to embodiments of the present invention.

FIG. 3 is a logic diagram in accordance with embodiments of the present invention. The partition logic 206 is indicated by a dashed rectangle. The partition logic 206 may include a decode circuit 226 and a partition table containing a partition offset 228 for the symmetric agent or processor 102a. The partition table may contain partition offsets for each of the symmetric agents or processor, including a partition offset 230 corresponding to the symmetric agent or processor 102n. The decode circuitry 226 may decode the agent ID of a symmetric agent or processor requesting a memory transaction or the agent ID may be provided from a table or other suitable means.

In FIG. 3, the decode circuitry 226 may receive information corresponding to the agent ID of a requesting symmetric agent or processor in the form of selected bits (e.g. bits 4 and 5) of a signal such as a deferred identifier (DID). The operation of the decode circuitry 226 may be enabled by any suitable means. In FIG. 3, the decode circuitry 226 may be enabled by bit 6 of a deferred identifier (DID) signal. When enabled, the decode circuitry may provide an index into the partition table and determines a partition offset associated with the symmetric agent or processor requesting the memory transaction. The partition offset may be provided to a logic component 232 via a bus 234. As shown in FIG. 3, the partition offset may be used to form the most significant bits of a physical address. If the OS of the computer system 100 (FIG. 1) uses 1:1 mapping of virtual addresses generated to physical addresses, then the designer of a system may be assured of the number of high order virtual address bits that will be unused (always zero) by the OS. Those bits may be used to define an independent partition in physical memory in a manner that is transparent to the OS without interference with code being executed in other partitions. Using separate physical memory partitions, multiple instances or instances of the same OS may be simultaneously executed by the computer system 100 (FIG. 1) even if the OS employs zero-based physical memory dependencies.

The virtual address generated by the OS may be provided to the logic component 232 via a bus 236. The logic component 232 may be an OR gate, as shown in FIG. 3, which may combine the high order physical address bits corresponding to the partition address from the partition table with the lower order physical address bits from the virtual address generated by the OS. In the example shown in FIG. 3, the virtual address generated by the OS is 64 bits in length and the high order 4 bits are not used. This allows the partition address corresponding with the agent ID of one of the symmetric agents or processors 102a–102n to be provided from the partition table and combined by the logic component 232 to form the high order 4 bits of the virtual address that is provided to the memory controller 218.

Figure 4:
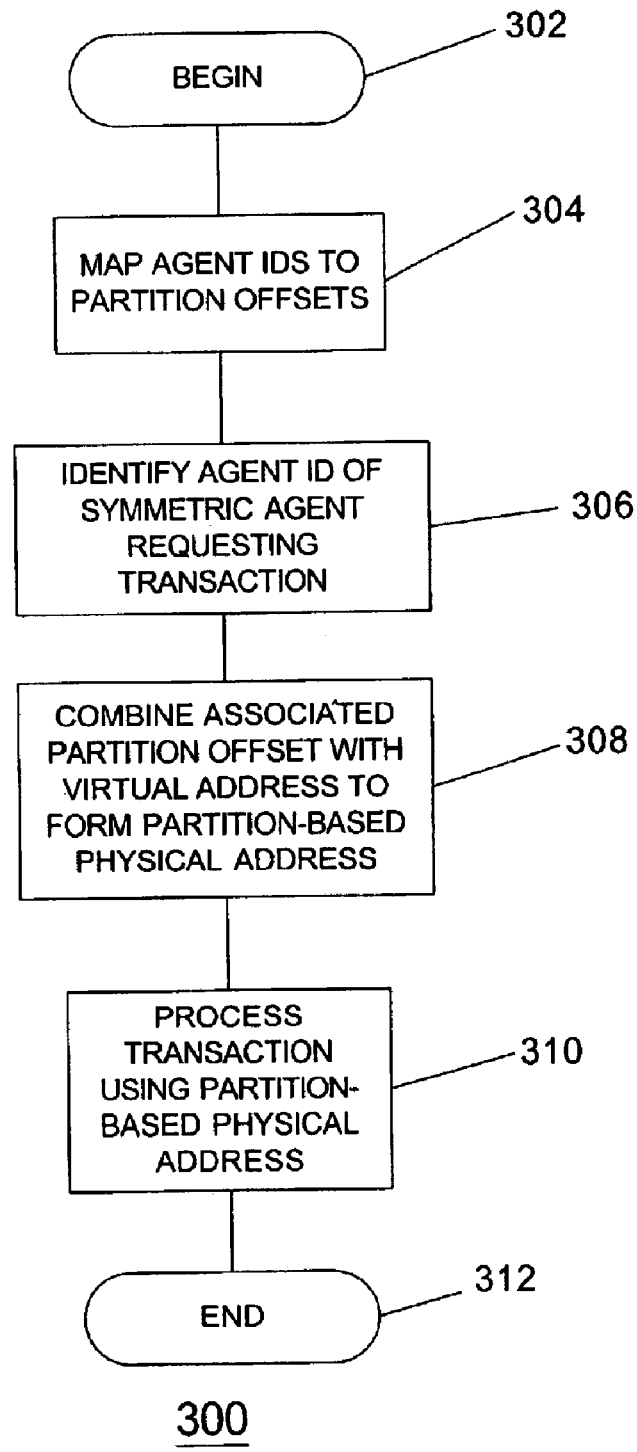
FIG. 4 is a process flow diagram according to embodiments of the present invention.

FIG. 4 is a process flow diagram according to embodiments of the present techniques. The process is generally referred to by the reference numeral 300. At block 302, the process begins. At block 304, the agent IDs of the symmetric agents or processors of the computer system 100 (FIG. 1) may be mapped to form partition offsets. This process may include identifying the agent ID assigned to each symmetric agent or processor using arbitration logic 208 (FIG. 2) or decoding the agent ID of a symmetric agent or processor that is requesting a memory transaction, as discussed with respect to FIG. 3.

The agent ID of a symmetric agent or processor requesting a memory transaction is identified at block 306. The agent ID may be used directly, modified or used as an index into a table that contains a partition offset corresponding to that specific agent ID. As discussed previously, each agent ID may correspond to a separate partition offset or multiple agent IDs may be mapped to the same partition offset. The partition offset may be combined with a virtual address generated by the OS of the computer system 100 (FIG. 1) to form a partition-based physical address, as shown at block 308.

To allow different instances of an OS with zero-based physical memory dependencies to execute simultaneously, separate partition offsets must be defined to correspond to agent IDs executing each instance of the OS. In this manner, the different instances of the OS may operate without interfering with each other in a manner that is transparent to any instance of the OS. Multiple instances of an OS may be executed simultaneously, each in its own physical memory partition, without modification of the source code of the OS and without an interposing software layer to perform address translation. At block 310, the partition-based physical address is processed, for example, by the memory controller 218 (FIG. 2, FIG. 3). The process ends at block 312.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A device for generating physical addresses in a multi-processor computer system that is adapted to support multiple physical memory partitions, the device comprising:
   circuitry adapted to determine an agent ID for each of a plurality of processors, the agent ID for each of the plurality of processors corresponding to a partition offset; and
   circuitry adapted to generate a physical address using the partition offset corresponding to the agent ID for one of the plurality of processors and a virtual address, wherein the circuitry adapted to generate a physical address is adapted to employ at least a portion of the partition offset as a high order component of the physical address and wherein at least a portion of the partition offset is combined with the virtual address by being substituted into a portion of the virtual address.

2. The device set forth in claim 1, comprising circuitry adapted to participate in an arbitration process with the plurality of processors to identify the agent ID associated with each of the plurality of processors.

3. The device set forth in claim 1, comprising circuitry adapted to decode the agent ID associated with at least one of the plurality of processors.

4. The device set forth in claim 3, wherein the circuitry adapted to decode the agent ID is adapted to receive a deferred identifier.

5. The device set forth in claim 1 wherein the partition offset corresponding to each of the agent IDs is stored in a table.

6. The device set forth in claim 1 wherein the circuitry adapted to generate a physical address is adapted to deliver the physical address to a memory controller.

7. A device for generating physical addresses in a multi-processor computer system adapted to support multiple physical memory partitions, the device comprising:
   means for determining an agent ID for each of a plurality of processors, the agent ID for each of the plurality of processors corresponding to a partition offset; and
   means for generating a physical address using the partition offset corresponding to the agent ID for one of the plurality of processors and a virtual address, wherein the means for generating is adapted to employ at least a portion of the partition offset as a high order component of the physical address and wherein at least a portion of the partition offset is combined with the virtual address by being substituted into a portion of the virtual address.

8. The device set forth in claim 7, wherein the means for determining comprises circuitry that is adapted to participate in an arbitration process with the plurality of processors to identify the agent ID associated with each of the plurality of processors.

9. The device set forth in claim 7, wherein the means for generating comprises circuitry adapted to decode the agent ID associated with at least one of the plurality of processors.

10. The device set forth in claim 9, wherein the circuitry adapted to decode the agent ID is adapted to receive a deferred identifier.

11. The device set forth in claim 7 wherein the partition offset corresponding to each of the agent IDs is stored in a table.

12. The device set forth in claim 7 wherein the means for generating is adapted to deliver the physical address to a memory controller.

13. A multi-processor computer system that supports multiple physical memory partitions, the multi-processor computer system comprising:
   a plurality of processors, each of which is assigned an agent ID;
   a storage device adapted to store executable instructions and data for use by the plurality of processors;
   a system memory adapted to receive and store executable instructions and data for use by the processor after such executable instructions and data are retrieved from the storage device;
   circuitry adapted to determine an agent ID for each of a plurality of processors, the agent ID for each of the plurality of processors corresponding to a partition offset; and
   circuitry adapted to generate a physical address using the partition offset corresponding to the agent ID for one of the plurality of processors and a virtual address, wherein the circuitry adapted to generate a physical address is adapted to employ at least a portion of the partition offset as a high order component of the physical address and wherein at least a portion of the partition offset is combined with the virtual address by being substituted into a portion of the virtual address.

14. The multi-processor computer system set forth in claim 13, comprising circuitry adapted to participate in an arbitration process with the plurality of processors to identify the agent ID associated with each of the plurality of processors.

15. The multi-processor computer system set forth in claim 13, comprising circuitry adapted to decode the agent ID associated with at least one of the plurality of processors.

16. The multi-processor computer system set forth in claim 15, wherein the circuitry adapted to decode the agent ID is adapted to receive a deferred identifier.

17. The multi-processor computer system set forth in claim 13 wherein the partition offset corresponding to each of the agent IDs is stored in a table.

18. The multi-processor computer system set forth in claim 13 wherein the circuitry adapted to generate a physical address is adapted to deliver the physical address to a memory controller.

19. A method of generating a physical address in a multi-processor computer system adapted to support multiple physical memory partitions, the multi-processor computer system having a plurality of processors, each of the plurality of processors having an agent ID associated therewith, the method comprising:
   mapping each of the agent IDs to a partition offset;
   identifying the agent ID of one of the plurality of processors that initiates a transaction; and
   combining the partition offset associated with the agent ID of the processor that initiated the transaction with a virtual address to form a physical address, wherein the combining comprises employing at least a portion of the partition offset as a high order component of the physical address and wherein at least a portion of the partition offset is combined with the virtual address by being substituted into a portion of the virtual address.

20. The method set forth in claim 19, comprising processing the transaction using the physical address.

21. The method set forth in claim 19, comprising determining the agent ID of each of the plurality of processors using an arbitration process.

22. The method set forth in claim 19, comprising decoding the agent ID of at least one of the plurality of processors.

* * * * *